Patented July 17, 1973

3,746,655
COLORED ACTIVATED CARBON
John E. Urbanic, Pittsburgh, Pa., assignor to Calgon Corporation, Pittsburgh, Pa.
No Drawing. Filed Feb. 7, 1969, Ser. No. 797,688
Int. Cl. B44d 1/94, 1/44
U.S. Cl. 252—430                   5 Claims

ABSTRACT OF THE DISCLOSURE

Particulate activated carbon may be made with a colorful decorative coating without sacrificing a significant portion of its adsorptivity, by utilizing a thermoplastic resin as a medium for coating the carbon and adhering a pigment to the coating.

BACKGROUND OF THE INVENTION

Activated carbon is useful as an adsorbent of many undesirable odors, contaminants and the like as well as for adsorbing and preserving or collecting desired components of liquids and gases. However, its appeal is limited for some product applications because it is always the same color, i.e., black, and there is a tendency to believe dust, dirt or fines may be present in it.

Prior to the present invention it has been extremely difficult to color activated carbon. Most commonly used pigments, paints and dyes are adsorbed onto the surfaces and into the pores of the carbon, thus tending to saturate its adsorptive capacity and drastically reduce the rate of adsorption on whatever capacity is left. A convenient method of pigmenting only the outside surfaces, while preserving a practical adsorption rate and capacity, had not been found.

SUMMARY OF THE INVENTION

I have found that an attractive colored coating may be applied to activated carbon by using a small amount of thermoplastic resin as a coating base.

Preferably the thermoplastic resin is one having an average particle size of 15 to 20 microns. However, the average particle size may be as low as 5 microns and as high as 100 microns. Generally speaking, relatively small particles of thermoplastic resin are desirable for coating granulated activated carbon. Polyethylene is the preferred thermoplastic resin; I have successfully used a polyethylene sold under the trademark "Microthene FN 500," which has an average particle size of less than 20 microns.

Thermoplastic resins other than polyethylene may be used provided they have a melting point no higher than is practical to work with, i.e., about 200° C. Polyvinyl chloride, having a melting point in the neighborhood of 175° C., is suitable but this temperature is significantly higher than that of polyethylene.

It should be noted here that polyethylene has been found to be an excellent bonding agent for granular carbon, and that, where bonded shapes are to be made, the pigment or dye can be applied either to the outer surface of the bonded shape after its formation or to the resin itself prior to formation of the shape.

My invention is applicable to powdered activated carbon as well as granular, but is most conveniently applied to granular activated carbon. By "granular" I mean having a mesh size of about 4 U.S. Sieve to about 60 U.S. Sieve. Activated carbon generally has a surface area of between 300 and 1,500 meters per gram.

In a preferred method of practicing my invention, the color pigment and resin particles are admixed. This mixture is then added to the granular activated carbon. The materials are then tumbled together or otherwise contacted so that the carbon particles are coated with the unfused resin and pigment particles. The coated particles are then allowed to fall freely through a hot zone of sufficient length and temperature to fuse the resin and pigment to activated carbon granules. The granules continue falling freely through a cooling zone so that when they are collected at the end of their travel they do not adhere. A modification in this procedure is to spray the pigment into the hot zone chamber so they will contact the resin-coated granules while the resin is tacky, so that the pigment will adhere to the resin surface. The hot zone may be generated by a flame. However, any method which will cause the coloring material to adhere to the resin and the resin to adhere to the carbon may be used.

The amount of resin used for an unbonded product may be anywhere in the range of 1% to 15% by weight of the carbon, although an amount in the upper end of this range should be selected only when a small portion of adsorptive capacity may be sacrificed. Preferably the resin will be about 2% to 5% of the weight of the carbon.

The pigment should not be used in amounts more than about 80% by weight of the resin unless the unbound pigment can be easily disposed of. The ability of the resin to retain the pigment is taxed at proportions higher than 60%. However, it should be noted that some pigments, notably titanium dioxide, are quite dense and somewhat more than 60% by weight of the resin may be tolerated for such pigments. To effectively color the resin-coated carbon, the amount of pigment used will vary with the pigment and the density of color desired. Although it could be said that a very small amount of pigment will impart color to a slight degree, insofar as such an effect is useful it is within the scope of my invention. For most practical purposes the minimum amount of pigment used is about 1% of the weight of the carbon or 25% of the weight of the resin, whichever is smaller. Within the term "pigment," I intend to include water-insoluble dyes.

In the following examples, "BPL Carbon" means an activated carbon with a total surface area of 1,050 to 1,150 m.$^2$/g. sold by Pittsburgh Activated Carbon Company, Division of Calgon Corporation, Pittsburgh, Pa.

"Microthene FN 500" is a powdered polyethylene resin with a melt index of 22, density of 0.915 and average particle size less than 20 microns sold by U.S.I. Chemicals Division of National Distillers and Chemical Corporation. Unless otherwise stated, the pigments were obtained from Ferro Corporation, Color Division, Cleveland, Ohio.

EXAMPLE I

Five grams of "Microthene FN500" were admixed with 1 gram of Ferro gold pigment. This was admixed with 100 grams of BPL 18 x 20 U.S. Sieve carbon. The mixture was placed in an oven at 150° C. for thirty minutes. Then the mixture was stirred while hot. The gold coating was evenly applied and the particles had a definite gold color.

A cigarette filter made from carbon colored according to Example I was found to have adsorbed 60% of the HCN in the cigarette smoke, as compared to 76%, which could normally be expected by uncolored carbon.

EXAMPLE II

Fifty grams BPL 14 x 40 were weighted and heated to 150° C. in an oven. The following amounts of pigments and "Microthene" were also obtained and mixed as binder mixes designated A, B, and C.

Mix A

|  | Grams |
| --- | --- |
| "Microthene FN 500" | 2.5 |
| Ferro bronze F-6011 | 0.5 |

Mix B

| | Grams |
|---|---|
| "Microthene FN 500" | 2.5 |
| Aluminum V-2022 | 0.5 |

Mix C

| | Grams |
|---|---|
| "Microthene FN 500" | 2.5 |
| Ferro gold F-6012 | 1.0 |

The above pigment binder mixes were blended three minutes in a vibrating mixer.

The carbon was removed from the oven and the binder pigment mix was sprinkled on the hot carbon. The carbon was stirred while adding. The coated carbon was transferred to 1-liter beakers and returned to the oven for further heating for thirty minutes. The carbon was then stirred again five minutes. The colors of the finished carbons corresponded to their respective pigments.

EXAMPLE III

Fifty grams of BPL 14 x 40 was used. Two and one-half grams of polyethylene was mixed with the carbon prior to heating. The pigments listed below were sprinkled on two portions of 25 grams each of the hot resin-coated carbon with stirring. The mixture was returned to the oven thirty minutes, removed and stirred five minutes.

Mix A

| | Grams |
|---|---|
| Aluminum V-2022 | 1.0 |

Mix B

| | Grams |
|---|---|
| Gold F-6012 | 1.0 |

This method gave the best color density and the least pigment separation.

EXAMPLE IV

Mix A

| | Grams |
|---|---|
| Gold F-6012 | 1.0 |
| "Microthene FN 500" | 2.5 |
| BPL 14 x 40 | 50 |

Mix B

| | Grams |
|---|---|
| Aluminum V-2022 | 1.0 |
| Polyethylene ("Microthene FN 500") | 2.5 |
| BPL 14 x 40 | 50 |

The ingredients of the above mixes were blended cold. They were then heated at 150° C. for thirty minutes and stirred hot for five minutes.

Mix IV-B was well colored, but the pigment was somewhat separated.

EXAMPLE V

Two samples of pigments from Harshaw Chemical Company, Division of Kewanee Oil Company, Cleveland, Ohio, were used.

Sample No. 3820—Zulu Green
Sample No. 4860—Zulu Blue, Peacock

Blue and green colored carbons were made using the technique described in Example III, from mixes described below.

Mix A

| | Grams |
|---|---|
| BPL 14 x 40 | 50 |
| "Microthene FN 500" | 1.5 |
| $T_iO_2$ (Fisher AR anhydrous) | 0.5 |
| Sample 3820 Green | 1.0 |

Mix B

| | Grams |
|---|---|
| BPL 14 x 40 | 50 |
| "Microthene FN 500" | 1.5 |
| Sample 3820 Green | 1.0 |

Mix A was a lighter green, although both mixes produced evenly colored carbon.

Mix C

| | Grams |
|---|---|
| BPL 14 x 40 | 50 |
| "Microthene FN 500" | 1.5 |
| $T_iO_2$ (as Mix A) | 0.5 |
| Sample 4860—Blue | 1.0 |

Mix C produced a colored carbon of deep violet color.

It may be noted from the examples that it is practical to utilize two coloring materials, particularly a basic or white pigment such as titanium dioxide together with an organic dye. The white pigment may of course be used alone.

Carbons such as were prepared in the above examples have been tested for their adsorptive capacities and have been found to be impaired no more than about 15% and usually only about 8%. More importantly, in an adsorption rate test of these colored carbon, it was found that adsorption rate was reduced no more than 25% and usually only about 10%. The following Example VI illustrates the relatively minor reduction in adsorption rate.

EXAMPLE VI

BPL 12 x 30 carbon was coated with "Microthene," then a pigment was added and mixed until the carbon was coated with the "Microthene" and pigment.

The coated carbon was then placed in a small vibrating feeder (Apparent Density Apparatus) fed down through a funnel for direction and through a spread flame for heat treatment, dropping into a tilted flat porcelain tray. The tray was tilted so the carbon particles could roll and not agglomerate. The colored carbon was then screened on a 12 x 30 screen, and thoroughly dedusted.

Following are the carbons and weights of materials used:

Mix A.—Gold colored

| | Grams |
|---|---|
| BPL 12 x 30 | 95 |
| "Microthene" | 6 |
| F-6102 gold Ferro Colors | 4 |

Mix B.—White colored

| | Grams |
|---|---|
| BPL 12 x 30 | 91 |
| "Microthene" | 5 |
| Titanium oxide | 4 |

Mix C.—Blue colored

| | Grams |
|---|---|
| BPL 12 x 30 | 91 |
| "Microthene" | 5 |
| Titanium oxide | 2 |
| Zulu Blue Peacock | 2 |

Mix D.—Yellow colored

| | Grams |
|---|---|
| BPL 12 x 30 | 91 |
| "Microthene" | 5 |
| Titanium oxide | 2 |
| Cadmium lithopane golden | 2 |

The following analyses were obtained on representative portions of the colored carbons after exposure to carbon tetrachloride vapor in air. Carbon tetrachloride capacity of uncoated carbon is 63% by weight.

| Sample: | Carbon tetrachloride percent weight |
|---|---|
| A | 58.3 |
| B | 58.1 |
| C | 58.5 |
| D | 58.0 |

The adsorption rates of the samples were then tested in a standard test in which a carbon bed 10 centimeters deep is set up and a mixture of 260 milligrams chloropicrin per liter of air is passed through the bed at a velocity of 32 feet per minute. The PS life (amount of time before breakthrough) was then recorded. Results may be compared to an uncoated PS life of fifty-eight minutes.

| Sample: | Minutes PS life |
|---|---|
| A | 42 |
| B | 48 |
| C | 48 |
| D | 53 |

Bonded carbon shapes were color-coated on their surfaces using the following methods.

EXAMPLE VII

Fifteen percent by weight of "Microthene" was added to BPL Pittsburgh Activated Carbon, thoroughly mixed and placed in a mold. Two inch by three inch approximately ½% by weight of gold pigment (Ferro colors F-6012 gold) was very lightly placed on top of the "Microthene" carbon mix. The mold was then placed in the oven for thirty minutes at 150° C. The result was a bonded carbon shape wtih a brightly colored gold surface.

EXAMPLE VIII

Fifteen percent weight of "Microthene" and carbon was placed in a mold and heat treated. The bonded carbon shape was cooled and taken from the mold.

Gold pigment was then brushed on the surface (approximately ¼% by weight). A flame from a Bunsen burner passed over the pigment to reheat the surface and set the pigment into the carbon.

EXAMPLE IX

Same shape as above only another surface. The pigment was brushed on, then "Microthene" was brushed over the pigment and heated with a flame as above, sealing the pigment into the surface.

EXAMPLE X

Same carbon shape as above; another surface. Zero point four (0.4) gram of "Microthene" was mixed with 0.1 gram of gold pigment, brushed onto shape and then heat treated as above. This appeared to be the best method.

In methods three and four the amount of pigment and "Microthene" coated on the shape is less than $1/1000$ the original weight of the shape.

I do not intend to be limited to the above specific illustrations and examples. My invention may be otherwise practiced within the scope of the following claims.

I claim:

1. Method of coloring particulate activated carbon comprising tackifying a mixture of coloring medium and thermoplastic resin, and contacting particulate activated carbon with the mixture to form a coating thereon.

2. Method of claim 1 in which the ratio of resin to coloring material is, by weight, from 15:1 to 3:2.

3. Method of claim 1 in which the resin is polyethylene having a particle size of 8 to 100 microns.

4. Method of claim 1 in which the coloring medium is a metallic, inorganic or organic pigment compatible with the resin used.

5. Method of coloring granular activated carbon with only minor loss of adsorptive capacity comprising forming a mixture of (a) granular activated carbon, (b) a particulated thermoplastic resin in an amount by weight about 1% to about 15% of the carbon, and (c) a pigment in an amount no greater than about 80% by weight of the resin, and heating the mixture while agitating it to render the thermoplastic resin tacky.

References Cited

UNITED STATES PATENTS

| 2,890,969 | 6/1959 | Schossberger et al. | 106—307 X |
| 2,907,671 | 10/1959 | Duvivier | 117—33 X |
| 2,933,455 | 4/1960 | Doying | 252—428 |
| 3,396,123 | 8/1968 | Urban | 252—428 |

PATRICK P. GARVIN, Primary Examiner

U.S. Cl. X.R.

117—62, 100 B; 252—444, 428